United States Patent [19]
Tanaka et al.

[11] Patent Number: 5,176,866
[45] Date of Patent: Jan. 5, 1993

[54] PROCESS FOR PRODUCING A RESIN PRODUCT HAVING A BENT HOLLOW PORTION AND A CORE USABLE FOR THE SAME PROCESS

[75] Inventors: Yuji Tanaka, Yokohama; Kiyoshi Tanada, Chiba, both of Japan

[73] Assignee: Asahi Kasei Kogyo Kabushiki Kaisha, Osaka, Japan

[21] Appl. No.: 535,295

[22] Filed: Jun. 8, 1990

Related U.S. Application Data

[63] Continuation of Ser. No. 318,168, Mar. 2, 1989, abandoned.

[51] Int. Cl.⁵ ............... B29C 33/02; B29C 39/26; B29C 45/00
[52] U.S. Cl. ............... 264/219; 29/460; 249/62; 249/78; 249/184; 264/317; 264/328.1; 264/334; 264/338; 264/DIG. 44; 264/DIG. 46; 264/295; 425/403; 425/440; 425/DIG. 12; 425/DIG. 13
[58] Field of Search ............ 264/313, 314, 317, 334, 264/347, 295, 236, 25, 271.1, 219, 279, 221, 279.1, DIG. 44, 328.1, 338, DIG. 46; 249/62, 63, 78, 183, 184; 425/392, 393, DIG. 10, DIG. 12, DIG. 14, 403, 440, DIG. 13; 29/460

[56] References Cited

U.S. PATENT DOCUMENTS

| | | | |
|---|---|---|---|
| 1,355,206 | 10/1920 | Woofter | 264/25 |
| 1,656,312 | 1/1928 | Black | 264/25 |
| 2,735,162 | 2/1956 | Huck | 264/313 |
| 2,865,079 | 12/1958 | Marchioli et al. | 264/314 |
| 3,136,831 | 6/1964 | Zinn | 249/62 |
| 3,692,892 | 9/1972 | Lemelson | 264/317 |
| 3,717,914 | 2/1973 | Baird et al. | 428/458 |
| 3,814,565 | 6/1974 | Cahour et al. | 425/393 |
| 3,882,220 | 5/1975 | Ryder | 264/DIG. 44 |
| 4,015,918 | 4/1977 | McPhee et al. | 425/392 |
| 4,027,543 | 6/1977 | Johnston | 264/347 |
| 4,065,242 | 12/1977 | Dickey et al. | 425/393 |
| 4,080,141 | 3/1978 | Usui | 425/393 |
| 4,298,330 | 11/1981 | Davis | 425/392 |
| 4,320,077 | 3/1982 | Moran | 264/295 |
| 4,352,387 | 10/1982 | Yamaguchi | 249/183 |
| 4,362,686 | 12/1982 | Clishem et al. | 264/317 |
| 4,537,736 | 8/1985 | Peltzman et al. | 264/295 |
| 4,587,075 | 5/1986 | Butcher et al. | 425/393 |
| 4,721,280 | 1/1988 | Barainsky | 249/63 |
| 4,738,816 | 4/1988 | Anderson | 264/313 |
| 4,746,386 | 5/1988 | Sato et al. | 264/313 |

FOREIGN PATENT DOCUMENTS

| | | | |
|---|---|---|---|
| 330446 | 6/1976 | Fed. Rep. of Germany . | |
| 2700782 | 7/1978 | Fed. Rep. of Germany | 249/183 |
| 2705459 | 8/1978 | Fed. Rep. of Germany | 264/166 |
| 3149264 | 6/1983 | Fed. Rep. of Germany | 264/334 |
| 61-14937 | 1/1986 | Japan | 264/334 |
| 64-63117 | 3/1989 | Japan . | |
| 64-63120 | 3/1989 | Japan . | |
| 579145 | 11/1977 | U.S.S.R. | 264/317 |
| 760596 | 11/1956 | United Kingdom . | |
| 842815 | 11/1957 | United Kingdom . | |
| 1541196 | 2/1979 | United Kingdom | 264/317 |

*Primary Examiner*—Jeffery Thurlow
*Assistant Examiner*—Mathieu Vargot
*Attorney, Agent, or Firm*—Birch, Stewart, Kolasch & Birch

[57] ABSTRACT

A core for producing a molded resin product having a bent hollow portion, including two-forked and multi-forked products used as parts for automobiles, and a process for producing the aforesaid resin product having a bent hollow portion by using said core.

11 Claims, 15 Drawing Sheets

FIG.1A
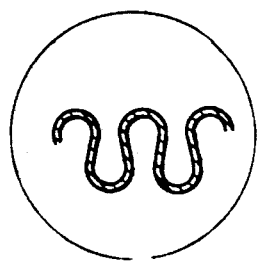
FIG.1C
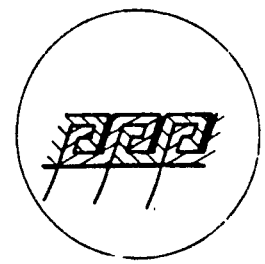

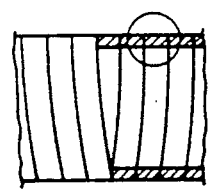 FIG.D
FIG.2A
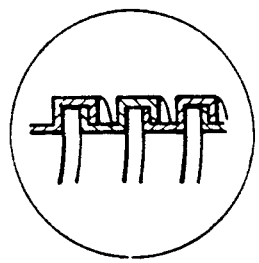
FIG.2C
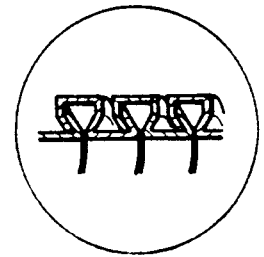

FIG. 3
FIG. 4
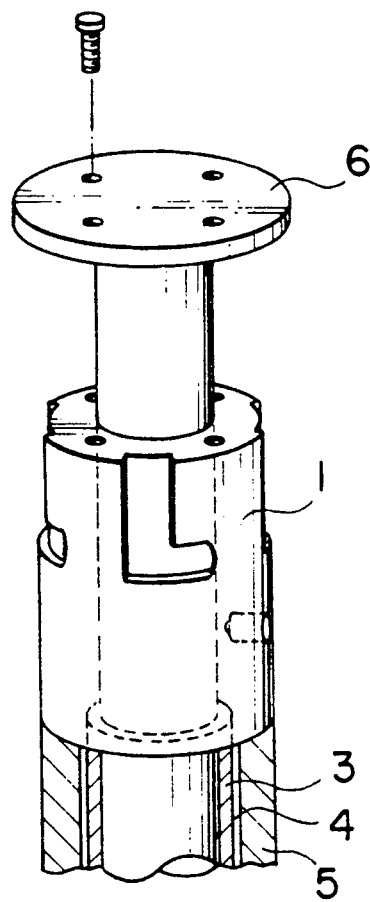
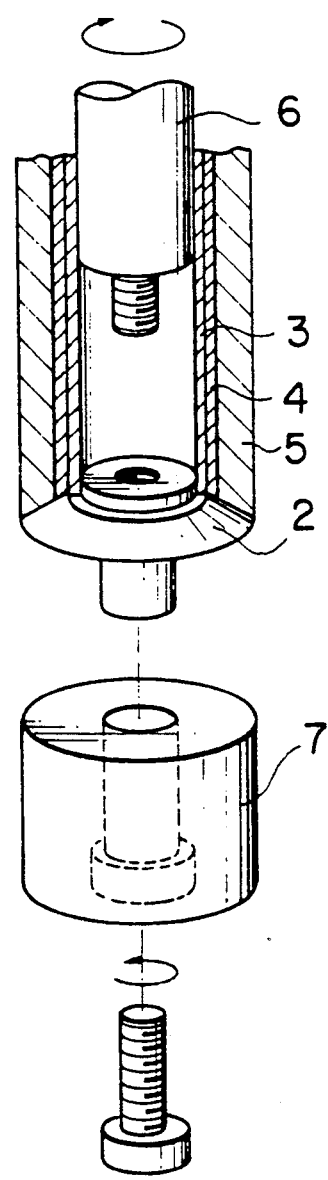

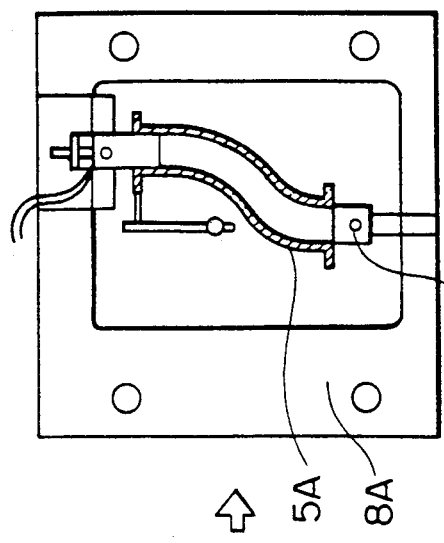
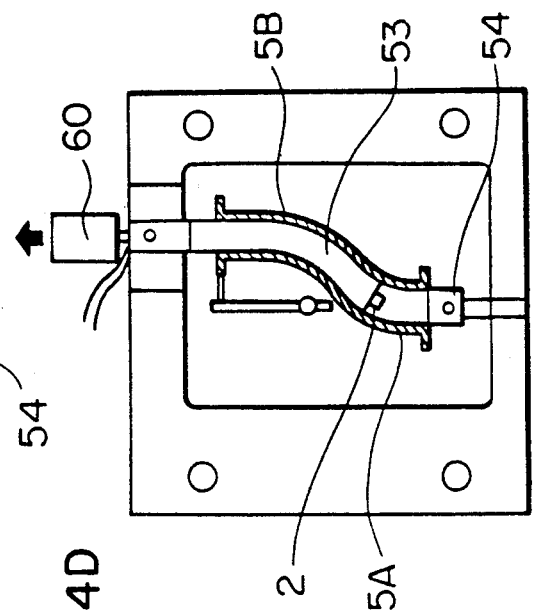
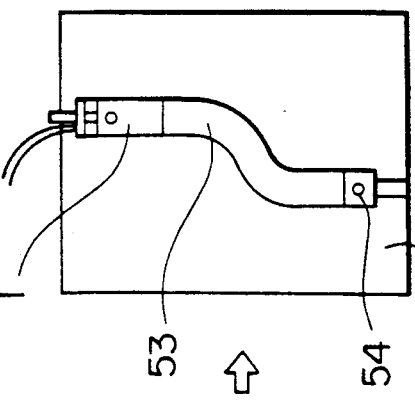
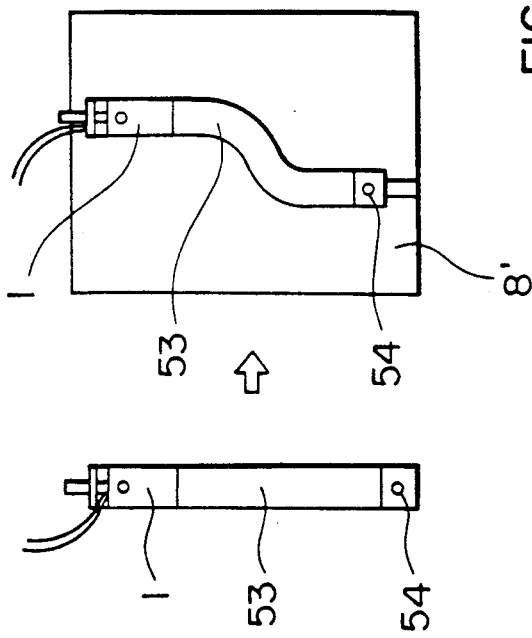

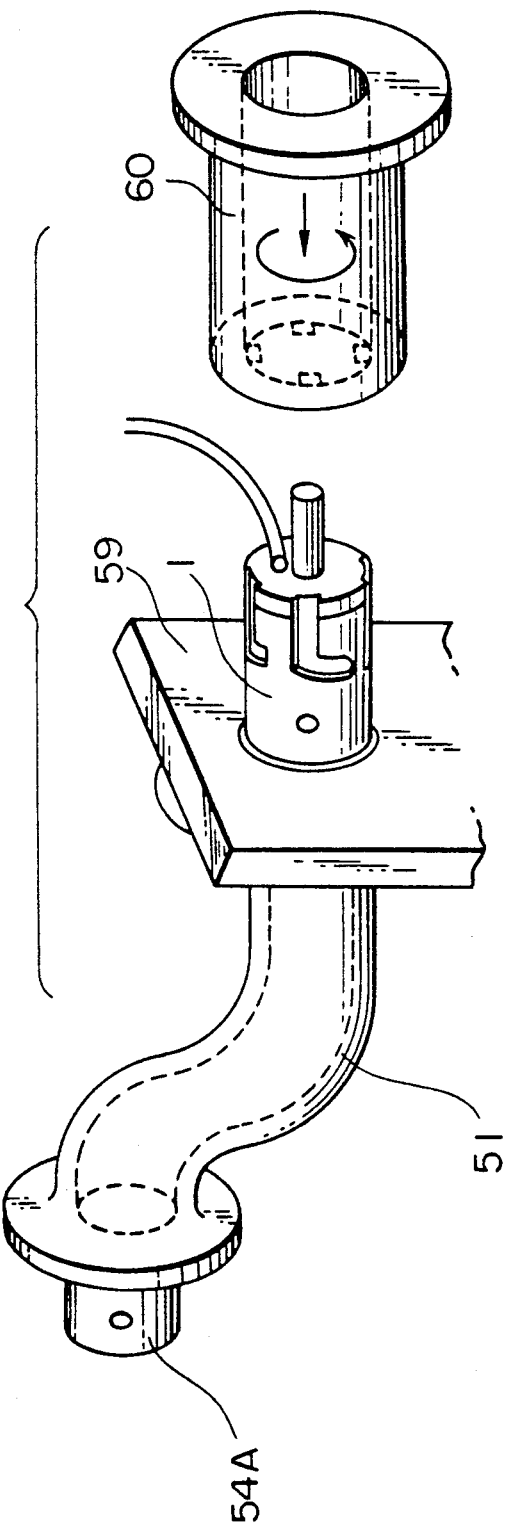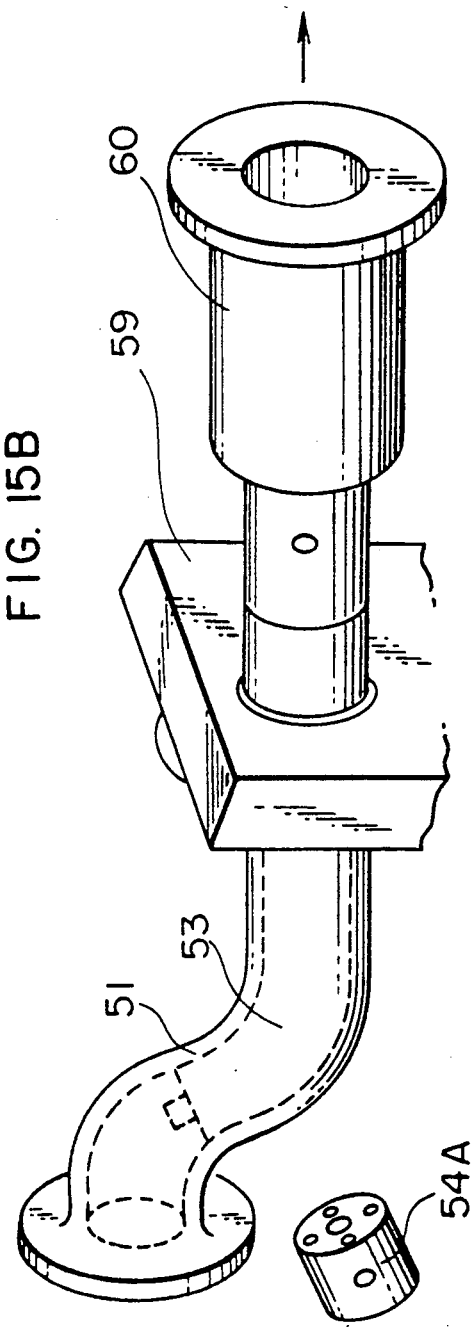

PROCESS FOR PRODUCING A RESIN PRODUCT HAVING A BENT HOLLOW PORTION AND A CORE USABLE FOR THE SAME PROCESS

This application is a continuation of application Ser. No. 07/318,168 filed on Mar. 2, 1989, now abandoned.

BACKGROUND OF THE INVENTION

1. Field of the Invention

This invention relates to a process for producing a resin product having a bent hollow portion, and a core used in said process. Specific examples of applications of the process and which employs the core include processes for the production of parts for automobiles which have a bent hollow portion, for instance, water a inlet/outlet, pipes such as oil strainers, ducts of induction systems and intake manifolds, in the case where metallic materials for these parts are replaced by resins.

2. Discussion on Related Art

As a process for producing a resin product having a bent hollow portion, such as an S-tube or U-tube, which cannot easily be obtained by molding by means of, for example, a slide core, there is a process which comprises forming a low-melting alloy (for example, melting point of 138° C.) consisting of Zn, Sn, Sb, etc. previously by casting, inserting the formed product into a mold as a core, coating the core with a resin, then heating the core consisting of the low-melting alloy to melt away the same from the resulting molded product, and thereby obtaining a resin product having a bent hollow portion.

However, the removal of the core consisting of the low-melting alloy by melting requires a long heating procedure to melt the alloy, and moreover in a case of mass production, the recovery and re-casting of the melted low-melting alloy is indispensable. Thus, the above process is disadvantageous in that the productivity is very low and that heat deterioration of the resin tends to occur because of an indispensable long heating step at a rather high temperature, which is not desirable for the resin product produced.

SUMMARY OF THE INVENTION

The present invention relates to a process for producing a resin product having a bent hollow portion which is characterized by using a core having a high flexibility, a high retention of shape, and a surface coated with an elastomer. The present invention is characterized in that it permits easy production of the aforesaid product by a simple step of withdrawing the core from a molded product, and that the core is reusable.

The first aspect of the present invention is directed to a process for producing a resin product having a bent hollow portion. The second aspect is directed to a core used in said process.

Embodiments of the first and second aspects are described below.

The present invention is also widely applicable in the case where the resin product having a bent hollow portion is a two-forked or a multi-forked pipe. In this case, a two-forked or multi-forked pipe having a complicated shape can easily be produced by using a combination of a plurality of cores and if necessary, an insert mandrel (hereinafter sometimes referred to as a die) or a part for branching.

As the first embodiment, there is mentioned a process for producing a resin product having a bent hollow portion which is characterized by deforming a core obtained by coating a heat-resistant elastomer on a skeletal structure having high flexibility and shape retention into a desired shape, inserting the deformed core into a mold, packing a resin into the mold cavity, and then withdrawing the core from the resulting molded product; and the core used in said production process.

As the second embodiment, there is mentioned a process for producing a resin product having a bent hollow portion according to the first embodiment, in which there is used, a core obtained by sealing a low-melting alloy in a skeletal structure having a high flexibility, to impart a high retention of shape to the skeletal structure; and the core used in this production process.

As a preferable embodiment of the first embodiment, there is mentioned a process for producing a resin product having a bent hollow portion according to the first embodiment, in which there is used a core constructed by coating an elastomer on a skeletal structure having high flexibility and shape retention capability which has previously been deformed into a desired shape, so as to have the same outer diameter in every portion of the core, thereby enabling a precisely molded product to be obtained; and the core used in this. production process.

When a multi-forked pipe is produced, a core for the multi-forked pipe is formed by properly selecting and combining the cores used in the above embodiments, taking into consideration their using positions, shapes, etc. If necessary, a rigid insert die and/or a part for branching could be used for the connection.

As embodiments under such conditions, the following are mentioned.

First, there is mentioned a process for producing a hollow multi-forked pipe made of a resin which is characterized by connecting a plurality of the cores having high flexibility and shape retention used in the above embodiments to one another by means of a part for branching to obtain a core for molding, deforming the core into a desired shape, inserting the core into a mold, packing a resin into the mold cavity, and then withdrawing out the plurality of the cores from the resulting molded product.

Second, there is mentioned a process for producing a multi-forked resin pipe comprising a plurality of bent hollow portions and a hollow spacious portion communicating with the bent hollow portion, which is characterized by connecting a plurality of the cores used in the above embodiments which have high flexibility and shape retention to a rigid insert mandrel for forming the hollow spacious portion communicating with the bent hollow portion, deforming the plurality of the cores for forming bent pipe portions into desired shapes to obtain a core for molding, inserting the enabling core into a mold, packing a resin into the mold cavity, and then withdrawing from the resulting molded product the plurality of the cores having high flexibility and shape retention and the rigid insert mandrel which constitute said core for molding.

In addition, the above embodiments are applicable to a process of foam molding, and in this case, there is provided a process for producing a resin product having a bent hollow portion according to the above various embodiments, in which the resin is obtained by a foam molding process.

BRIEF DESCRIPTION OF THE DRAWINGS

FIGS. 1 to 17 show examples of the cores of the present invention, their constitutions, and flow sheets of molding steps using the cores.

FIG. 1A and FIG. 1B show examples of the constitution of a flexible metal pipe as a core material which has high flexibility and shape retention. FIG. 2A and FIG. 2B show examples of the constitution of a flexible metal pipe having a high flexibility alone. A partially enlarged view is shown in the upper portion of each figure.

FIG. 3 and FIG. 4 are examples of diagrams showing the constitution of a core. FIGS. 5 and 5B are a cross-sectional view for showing a working state of an apparatus used for coating an elastomer on the surface of a flexible pipe having the constitution shown in FIG. 2A, in producing a core using the flexible tube.

FIG. 6 and FIG. 7A show examples of a core composed of a combination of the flexible pipe shown in FIG. 2, a low-melting alloy, and a flexible heater.

FIG. 8 shows one example of the flexible heater constituting the aforesaid skeletal structure.

FIG. 9 shows one example of a variation of the constitution of core shown in FIG. 7.

FIG. 10 shows one example of a connection state of a terminal metal part portion in the case where the aforesaid flexible pipe is coated in a bent state with an elastomer.

FIG. 11 shows one example of a flanged S-tube made of a resin of the present invention. FIGS. 12 and 13 show parts for fixing a core in a mold, and accessory parts. In the Figures, 52, 54, 55 and 56 show a projection for combining the core itself with an adapter (54), the adapter, a mold for providing a shape, and a magnet for fixing or connecting the core itself with the adapter, respectively.

FIGS. 14A through FIG. 14D and FIGS. 15A and 15B are schematic illustrations of examples of the molding step in the case where the core of this invention is used, and method for withdrawing the core. In FIGS. 14A through FIG. 14D, 8' shows a mold for providing a shape, 5A a resin, 8A a mold for injection molding, and 60 a pull for withdrawal. In FIGS. 15A and FIG. 15B, 54A, 51, and 59 show an adapter, a molded product, and a clamp plate, respectively.

DETAILED DESCRIPTION OF PREFERRED EMBODIMENTS

Figure 1B:
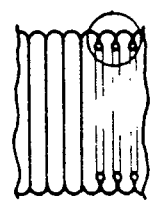

The present invention relates to a process for producing a resin product having a bent hollow portion, such as an S-tube or U-tube. More particularly, it relates to a process for producing a resin product having a bent hollow portion which comprises a step of molding a resin product by applying a resin at least around a core having such a high retention of shape that the core does not undergo substantial deformation by a resin flow during molding, and such a high flexibility that at the time of withdrawing the core, the core is deformed in accordance with the shape of a molded product and hence does not injure the molded resin product, while maintaining the core in a desired shape; and a step of withdrawing the core.

In this invention, the passage "applying a resin at least around the core" means that the resin of the present invention is applied to a portion of the core to form a molded product portion having a bent hollow portion in the case of the production of a resin product having the molded product portion and a molded product portion having no bent hollow portion. As to a method for the application, although injection molding or cast molding is usually employed, a resin may be applied by a method suitable for molding a desired resin product, such as coating.

The above-mentioned core of this invention has high flexibility and shape retention and comprises a skeletal structure, desirably a hollow structure having a high flexibility, an elastomer covering the surface of said structure, and a means having a high retention of shape which is, if necessary, provided in the hollow portion of said structure.

The core having high flexibility and shape retention used in this invention is preferably a core which has such a high flexibility that its bending or unbending force is such that the core can be deformed with a force not larger than the compression strength of the resin matrix of a product, and such a high retention of shape that the core is not deformed at least by the flow pressure (2 to 3 kg/cm$^2$) of resin. More preferably, at the time of withdrawing the core, the core has such a flexibility that its bending or unbending force is 50 kg or less, and the surface of the core is coated with an elastomer which is not adhesive to a resin to be used, does not flow at the molding and processing temperature of said resin, and is heat-resistant, so as to avoid an unevenness of the surface.

The skeletal structure constituting the aforesaid core having a high flexibility and such a high retention of shape that the core is not deformed by the flow pressure of a resin is a structure having a high flexibility and for example, a cylindrical shape. Specific examples of the skeletal structure include, for example, ductile metal structures made of copper, copper alloy, lead, aluminum, aluminum alloy, or the like; flexible pipes such as bellows tubes obtained by forming a pipe from a thin plate of steel, copper, copper alloy, aluminum alloy, or the like, as skeletal structures having the structure shown in FIG. 1; and combinations of said ductile structures and said flexible pipes. Examples of the flexible pipes include, for instance, flexible pipes having the same constitution as those used in protective pipes for optical fibers, oscillating parts of desk or floor lamps, etc. In order to maintain a desired shape of a skeletal structure having the constitution shown in FIG. 2, the retention of the shape can be improved by sealing a low-melting alloy in the hollow portion of a flexible pipe or a hose for reinforcing the retention of shape, heating the pipe or hose to melt the low-melting metal, thereby imparting thereto flexibility, forming the pipe or hose into a desired shape, and then cooling the pipe or hose. Although the shape of the skeletal structure is usually a cylindrical shape, its section may be oval or square, according to the shape of a desired product.

In this case, as a method for the heating, there can be employed various methods, for example, methods using an external apparatus, such as heating by a heat transfer method by means of hot air, and by a radio frequency induction heating method and a method of providing a heater inside the core.

However, in this invention, the constitution of the skeletal structure and a material constituting said structure are not critical, so long as said structure has a high flexibility and if necessary, a high retention of shape.

Figure 2B:
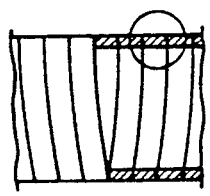
Figure 2D:
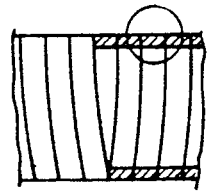

The elastomer provided on the surface of the skeletal structure shown in FIG. 1 or FIG. 2 is not critical so long as it abolishes the unevenness of the surface of the skeletal structure, has such a heat resistance that it does not flow at a molding temperature of a resin to be molded, and is not adhesive to said resin. Specific examples of elastomers usable in this invention include natural rubber, synthetic rubbers such as silicone rubber, fluororubber, urethane rubber, butadiene rubber, and the like, and thermoplastic elastomers.

As a method for providing the elastomer on the skeletal structure as shown in FIG. 1 or FIG. 2, there can be employed molding methods such as casting under vacuum, injection, compression molding, and the like.

Specifically, a straight metal rod which fits the inside diameter of the skeletal structure is inserted into the skeletal structure and fixed for positioning of the skeletal structure in a mold, after which the skeletal structure is inserted into a mold for coating with a rubber, and the elastomer is provided thereon by casting under vacuum, or the like.

The elastomer can be provided in a desired shape from the beginning by inserting a metal rod previously bent into a desired shape into the skeletal structure, fixing the metal rod, thereafter inserting the skeletal structure into a mold for coating with a rubber, and coating the skeletal structure with the elastomer.

However, when the radius of curvature is less than 80 mm in the bent portion of a resin to be produced by using a core constructed of a flexible pipe and an elastomer (e.g., a heat shrinkable silicone tube), firstly said pipe is covered by an elastomer tube, and, then an elastomer coating is provided on said elastomer tube, thereby the flexibility of the core can be retained because only small portions of the tube can enter the depressions of the flexible tube and the depressions are prevented from being filled by the elastomer coating. The two elastomers are preferably highly adhesive to each other and more preferably of the same type.

The thickness of the elastomer provided is not critical, so long as the unevenness of the surface of a skeletal structure is abolished.

A specific process for producing the core is as follows. The process for producing the core which is the second aspect of the invention is described below in detail with reference to FIGS. 3 to 10.

Figures 5A, 5B:
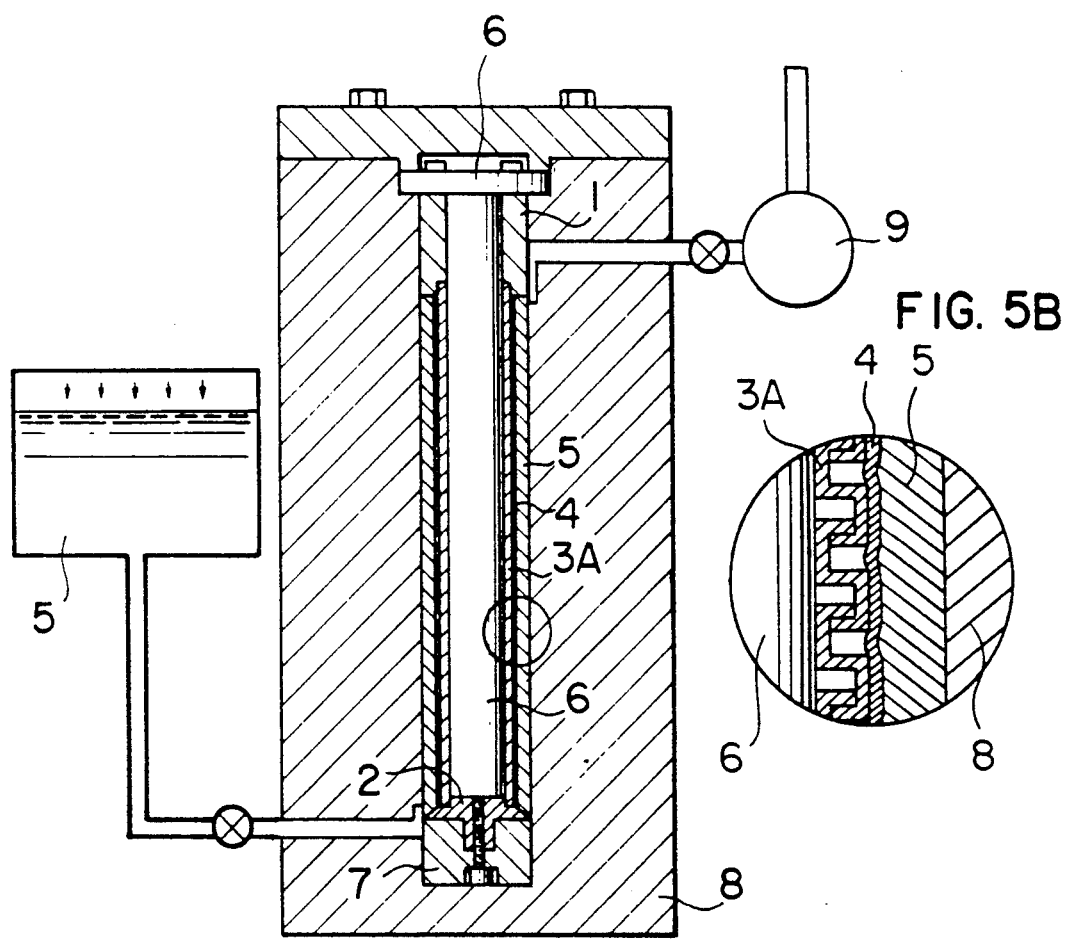

As shown in FIGS. 3 and 4, a metal terminal part 1 having portions for positioning and supporting in a mold by means of pins or the like during molding and a gripe or a hitching portion, and a metal terminal part 2 are attached to the skeletal structure 3 (a flexible pipe) shown in FIG. 1 or FIG. 2 at one end of a flexible pipe and the other end, respectively, by a means such as welding, or bolts and nuts. Next, a metal rod 6 which fits the inside diameter of the skeletal structure having the metal terminal parts 1 and 2 attached thereto is inserted into the skeletal structure and fixed by means of, for example, bolts. The surface of the skeletal structure 3 is covered with a heat-shrinkable tube made of silicone (thickness: 0.5 to 1 mm) 4 and the is heated to be adhered to the surface of the skeletal structure 3. Subsequently, as shown in FIG. 5, said structure is inserted into a cylindrical mold 8 for vacuum casting, and the mold cavity is evacuated by means of a vacuum pump 9.

Then, silicone rubber 5 of the same type as with the tube 4 covering said structure, is injected so as to make its surface smooth and adjust its size to the inside diameter of a product, followed by pressurizing. Thus, said structure is coated with the silicone rubber 5, which is then heated and vulcanized. In this case, if necessary, an adapter 7 may be used in the coating with the silicone rubber 5. In the present process, the adapter may be used for positioning in the mold 8.

Figure 6:
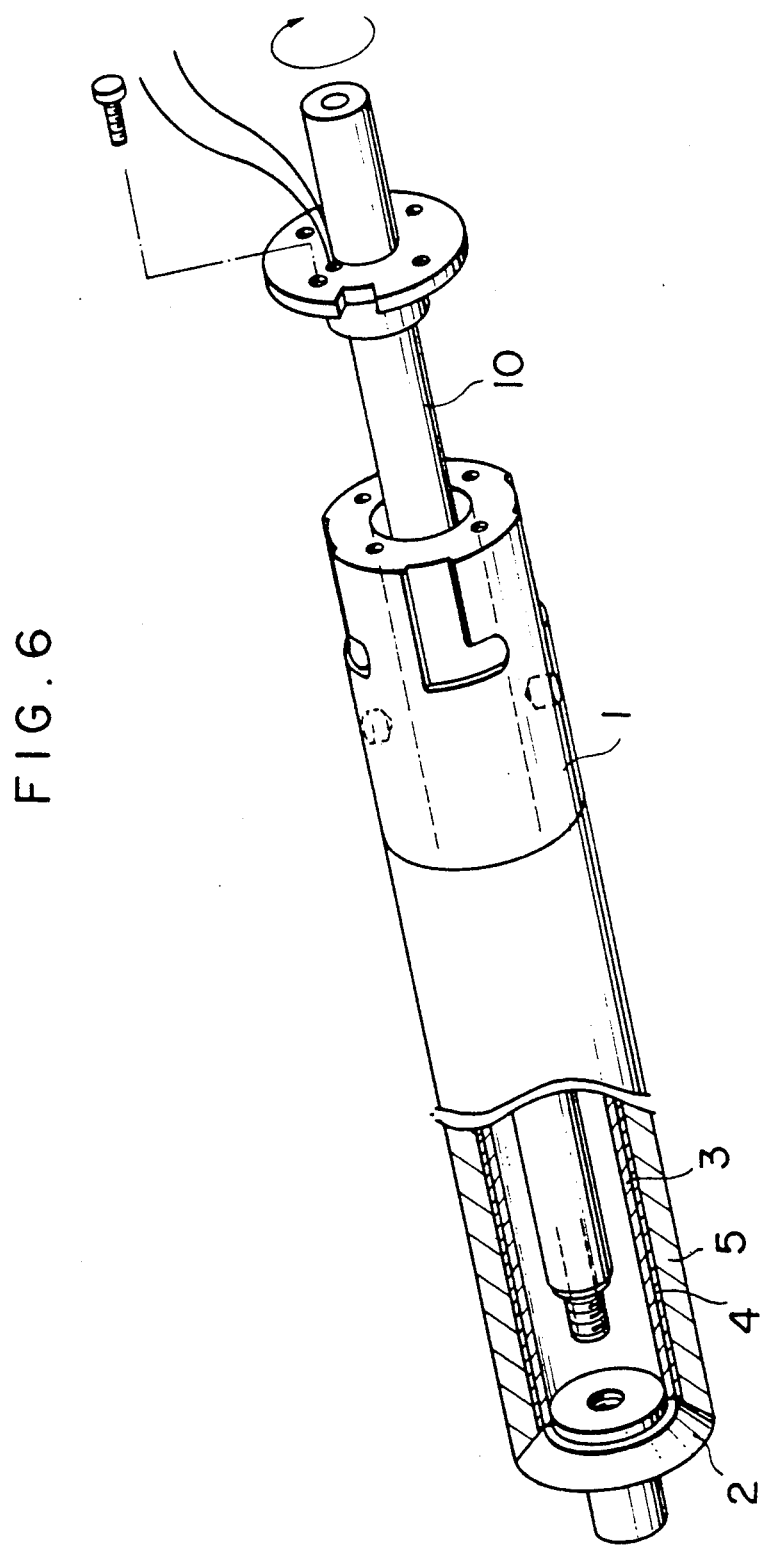
Figure 7A:
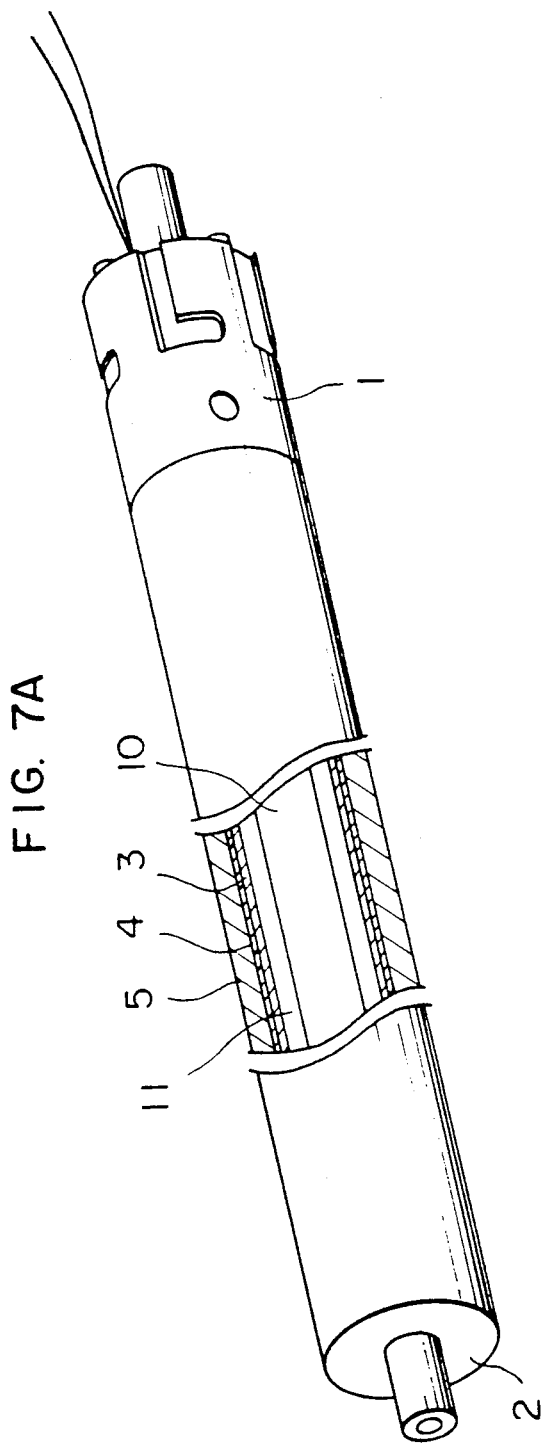
Figure 7B:
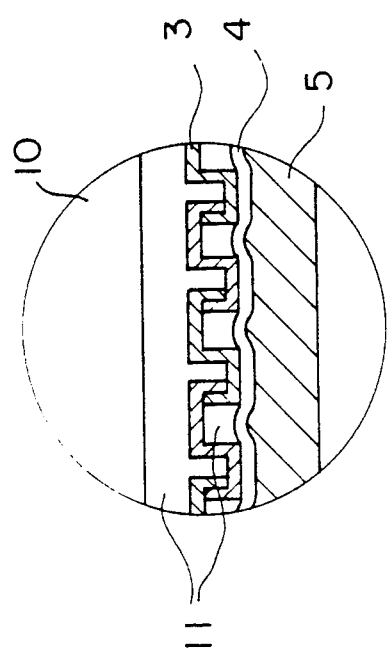
FIG. 7B is a partially enlarged view of the constitution of core shown in FIG. 7A.

Next, the metal rod inserted into the skeletal structure 3 coated with the silicone rubber is withdrawn from said structure. As shown in FIGS. 6 and 7, a flexible heater 10 which, has a high flexibility as in the case of the skeletal structure is inserted into the hollow portion of said structure and fixed. Then, a low-melting alloy 11 is sealed in a space between the inner surface of the skeletal structure 3 and the outer surface of the flexible heater 10, whereby the desired core is obtained. The melting point of alloy to be sealed therein will be in range of about 50° C. as a lower limit and about 140° C. as an upper limit, while the alloy can be freely chosen depending upon the type of resin, the manner for applying the resin and the like.

Needless to say, the metal terminal part 2 should have such a shape as would cause no trouble during the withdrawal of the core from a molded product. When the skeletal structure 3, the one which has the constitution shown in FIG. 1 is used, it can sufficiently exhibit a function as the core in this invention even when neither flexible heater 10 nor low-melting alloy 11 are inserted into the hollow portion of said structure.

It is sufficient that the aforesaid heater having a high flexibility has the capacity to generate a heat capacity sufficient for melting the low-melting alloy 11 sealed in the core. Specifically, the heater is as follows. Specific examples of the constitution of the heater are explained below with reference to FIG. 8.

As skeletal structure 18 of the heater, there is used one which has the same constitution as that of the skeletal structure used in the aforesaid core. The metal terminal parts 1 and 2 shown in FIGS. 3 and 4 and metal terminals 12 and 13 for fixation are attached to said structure by welding. Next, the surface of said structure is covered with an insulating layer 14 (a heat-shrinkable silicone tube and the like), after which a glass-Nichrome wire 15 is wound onto said structure at adequate intervals of, for example, about 5 mm. In this case, when lead-out wires 16 for electric source are desired to be in the same direction, the glass-Nichrome wire 15 and wires 16 for an electric source are wound onto the insulating layer 14 in parallel with each other. As the wire 16 for electric source, a Teflon ® (a registered trademark of Du Pont) coated wire having a high heat resistance is preferably used in view of the surface temperature of the glass-Nichrome wire.

Finally, the surface of the thus treated skeletal structure is coated with an elastomer 17 (silicone rubber) which, at least, does not flow at the melting point of the low-melting alloy to be used, whereby a flexible heater is completed.

The hollow portion of a small flexible pipe 18 of the heater can be used as a cooling cavity for cooling the core to solidify the low-melting alloy inside the core.

It is sufficient that the provision of said elastomer is carried out in the same manner as for the provision on the surface of the skeletal structure of core shown in FIG. 5.

Figure 9:
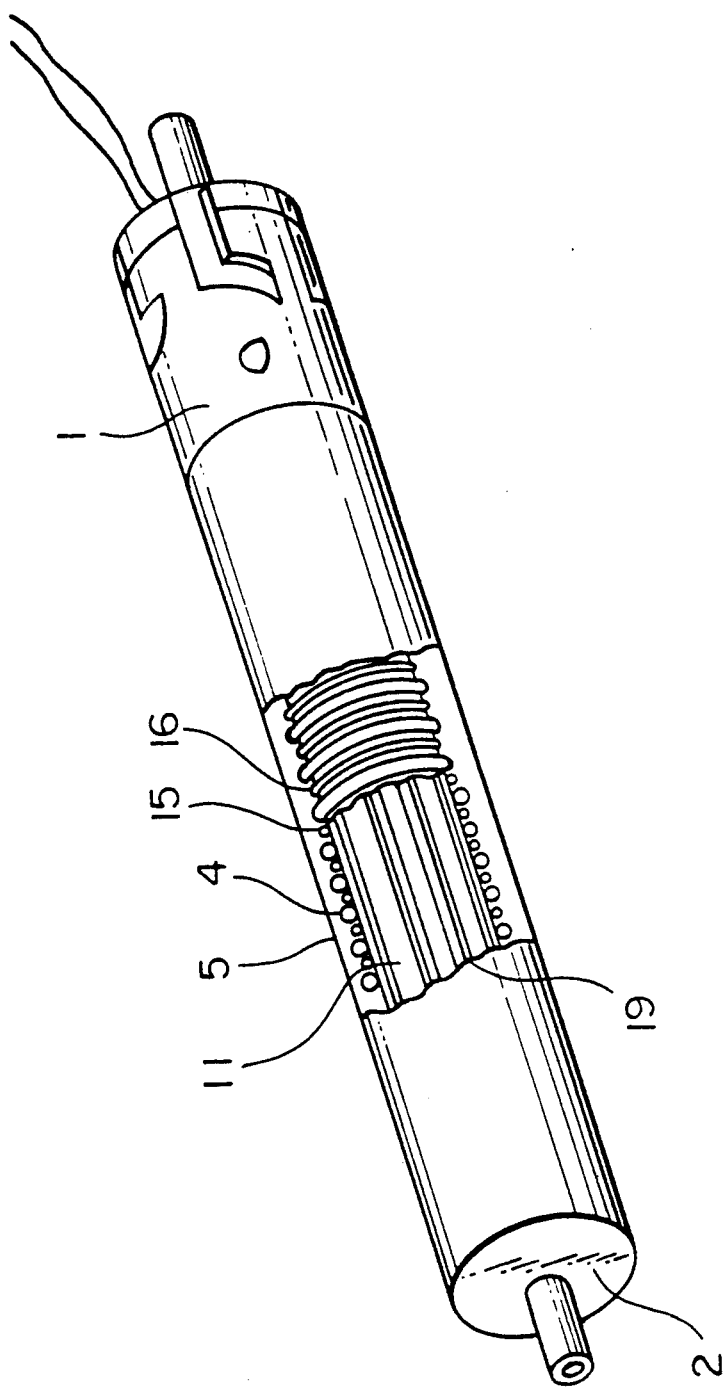

Needless to say, as shown in FIG. 9, a glass-Nichrome wire 15 may be wound onto the core itself in the same manner as described above. Preferably, a skeletal structure 19 having the same constitution as that of the aforesaid skeletal structure is inserted into the central portion of the core and fixed, and the hollow portion of an inner flexible pipe 19 is used as a cooling cavity for reducing the amount of the low-melting alloy 11, whereby the solidification time can be reduced. The skeletal structure 19, of course, requires a treatment, for example, a coating of its surface with an elastomer for preventing air leakage.

Needless to say, materials constituting said heater and the constitution of said heater are not critical so long as they satisfy the requirements according to the present invention.

Figure 10:
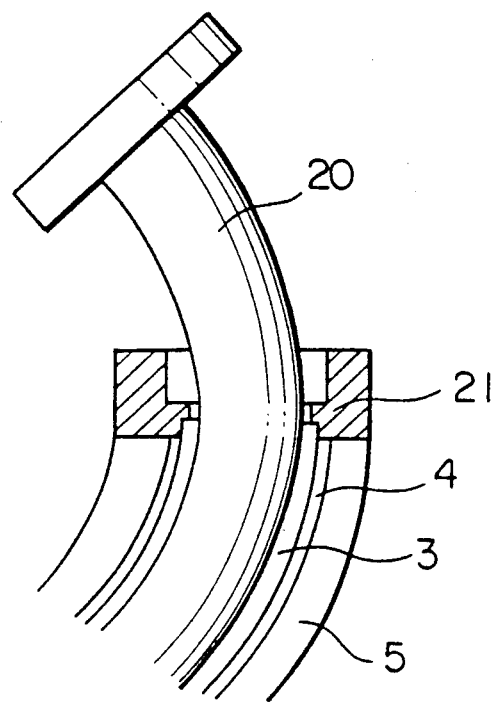

When an elastomer is previously coated in a desired shape in the case of a heater having the same constitution as in the above specific example, a metal terminal part 21 should, of course, be designed by considering the curvature radius of a metal rod 20 previously bent into a desired shape so that as shown in FIG. 10, the metal rod can be inserted into the skeletal structure 3 and withdrawn therefrom. In this case, a split mold should be used.

As the resin used in the process for producing a molded product having bent hollow portion of this invention, either thermoplastic resins or thermosetting resins may be used so long as they satisfy the required characteristics of the resin product. The resin may be incorporated with desired amounts of reinforcing agents, fillers, foaming agents, coloring agents, stabilizing agents, coloring agents, etc.

When a thermoplastic resin is used as the resin used for producing a resin product having a bent hollow portion by means of the core of this invention comprising a skeletal structure having high flexibility and shape retention and an elastomer coating thereon, there can be employed methods such as injection molding, foam injection molding, and the like. When a thermo-setting resin is used, there can be used molding methods such as injection molding cast molding, transfer molding, compression molding, and the like.

As a specific example, a process for producing a resin product in the form of a two-forked pipe or multi-forked pipe is explained below with reference to FIGS. 16 and 17. First, one example of the production of a two-forked pipe is explained below.

Figure 16A:
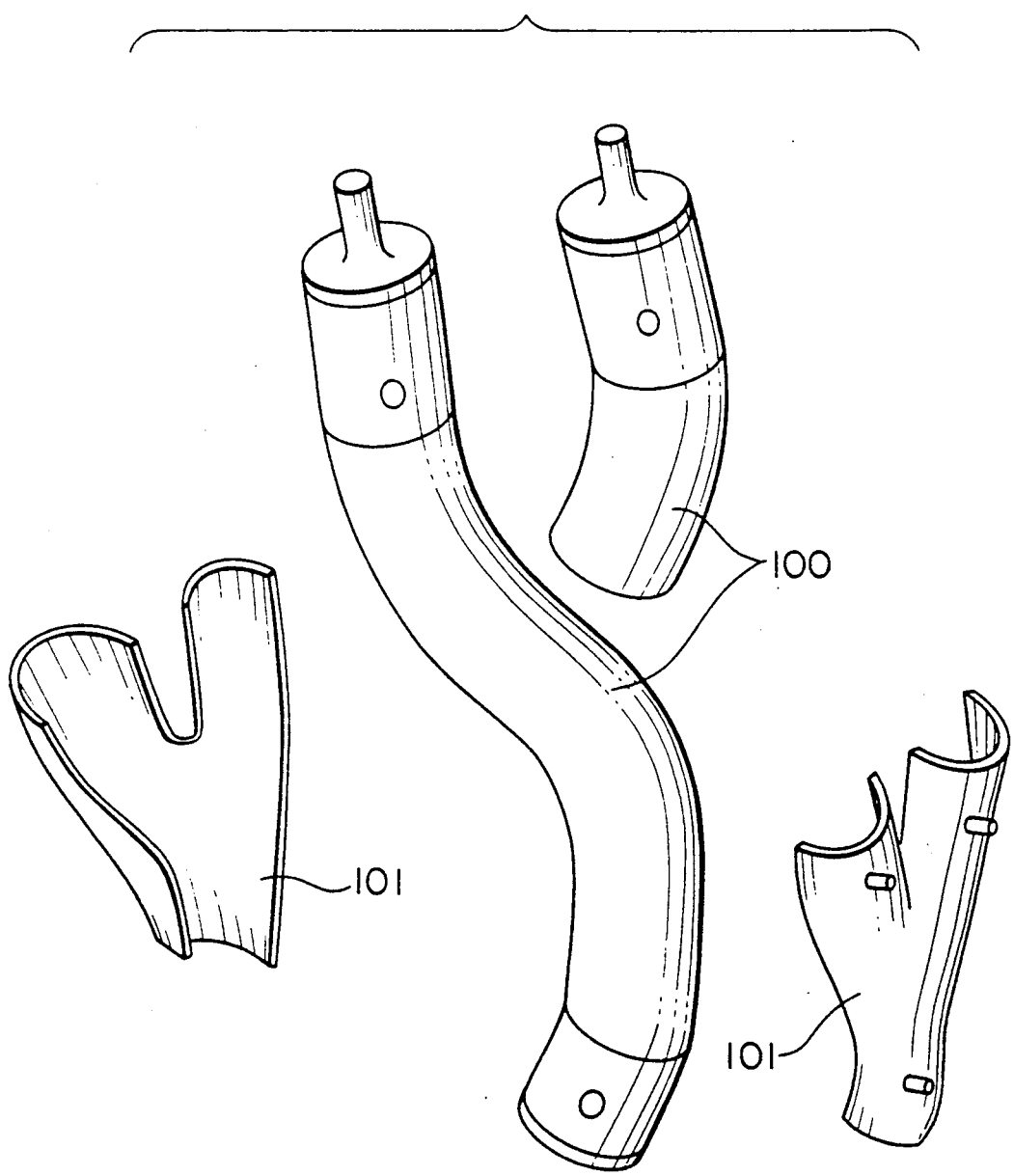
FIGS. 16A, 16B and 16C and FIGS. 17A, 17B and 17C show a combination of a plurality of cores and a part for connecting the cores to each other, and a combination of cores with one another, in the case of production of a two-forked tube or a multi-forked tube.
Figure 16B:
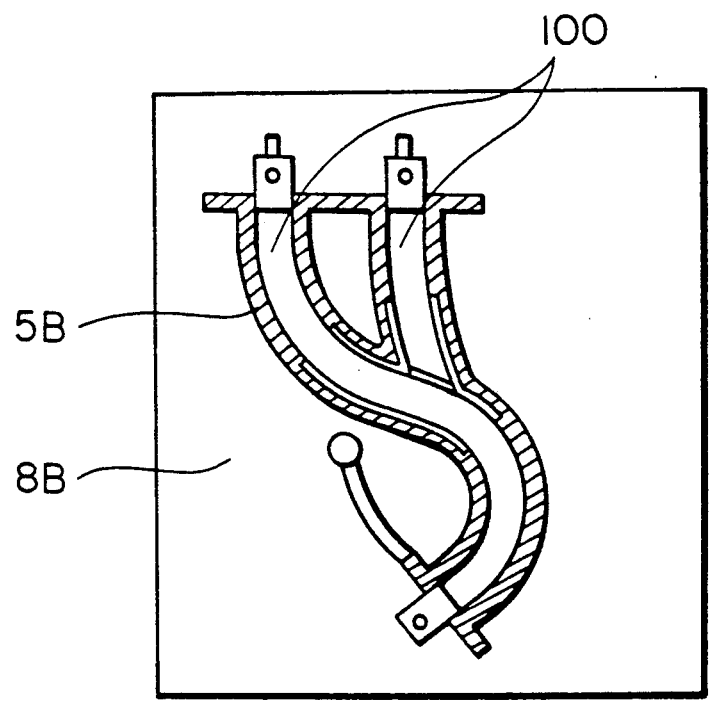
Figure 16C:
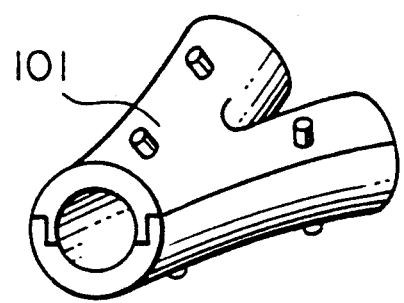

In the two-forked pipe having a bent hollow portion shown in FIG. 16, the cores 100 of the above third embodiment are used. Two of the cores are preformed in the same manner as described above, and then connected to each other by means of a part for branching 101 having a snap-fit structure for uniting the two cores in a body, to obtain a core for molding. Next, the core for molding thus obtained is inserted into a mold 8B and positioned. In this case, when fixation only at the end of the core involves a problem (for example, movement of the part for branching due to flow pressure of resin at the time of packing a resin 5), the part-for-branching 101 portion may be fixed by forming a projection or the like on the part for branching 101, and a hole in the mold 8B at the same position as that of the projection.

Subsequently, a resin 5B is packed into the mold 8B by injection molding or the like, after which the core 100 is drawn out from the resulting molded product while fixing the flange portion, by the same method as used in the case of the above S-tube, whereby a resin product of two-forked tube shape is obtained.

In this case, the part for branching is left in the molded product and constitute a part of the product.

Figure 12:
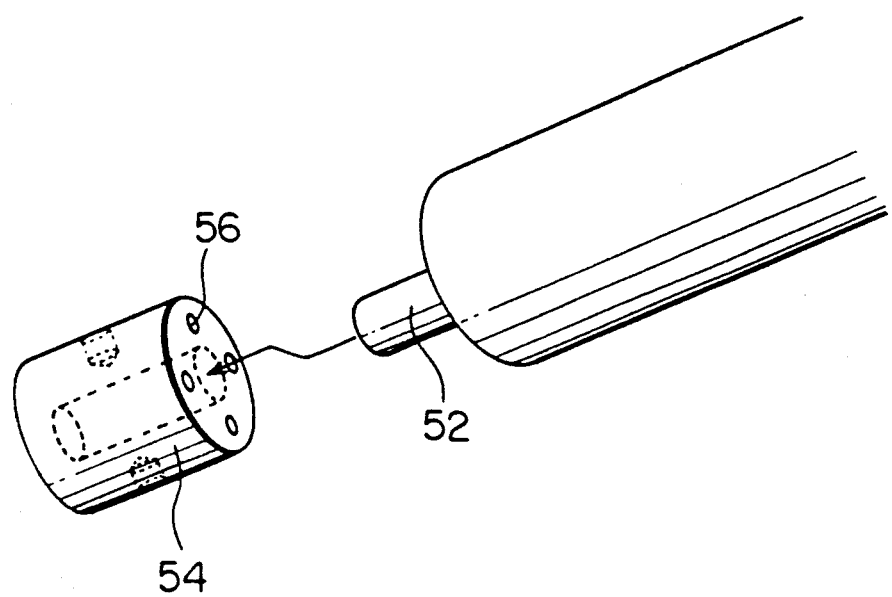
Figure 13:
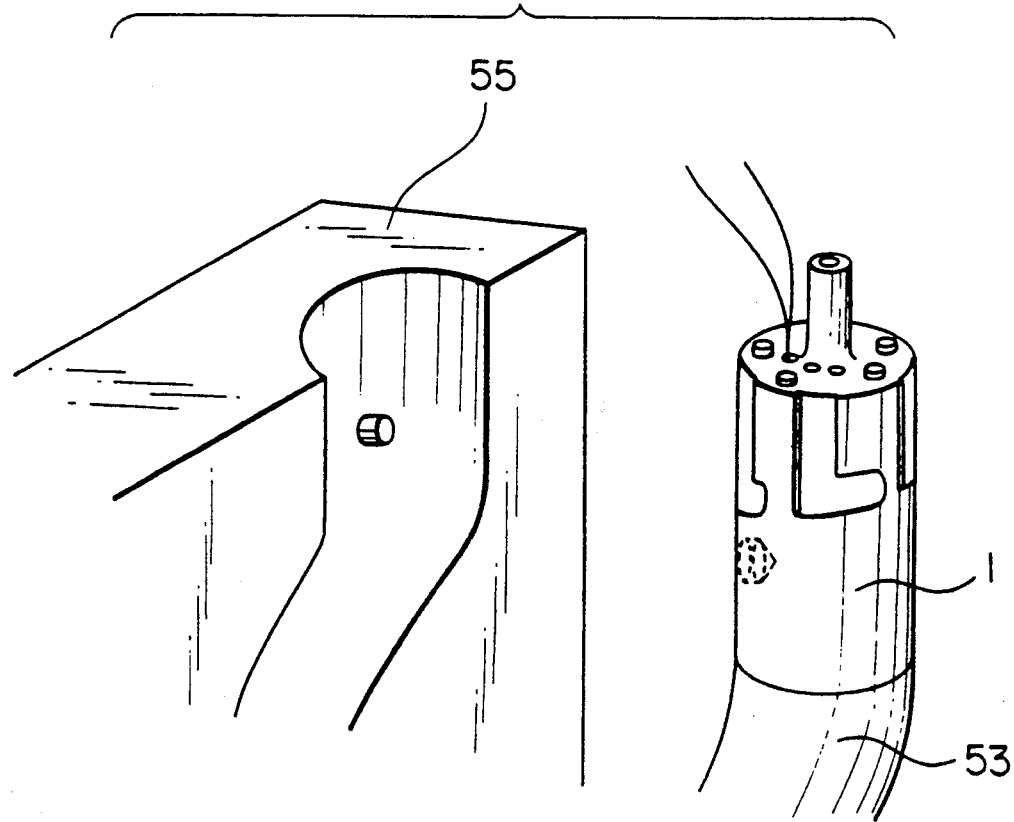
Figure 17A:
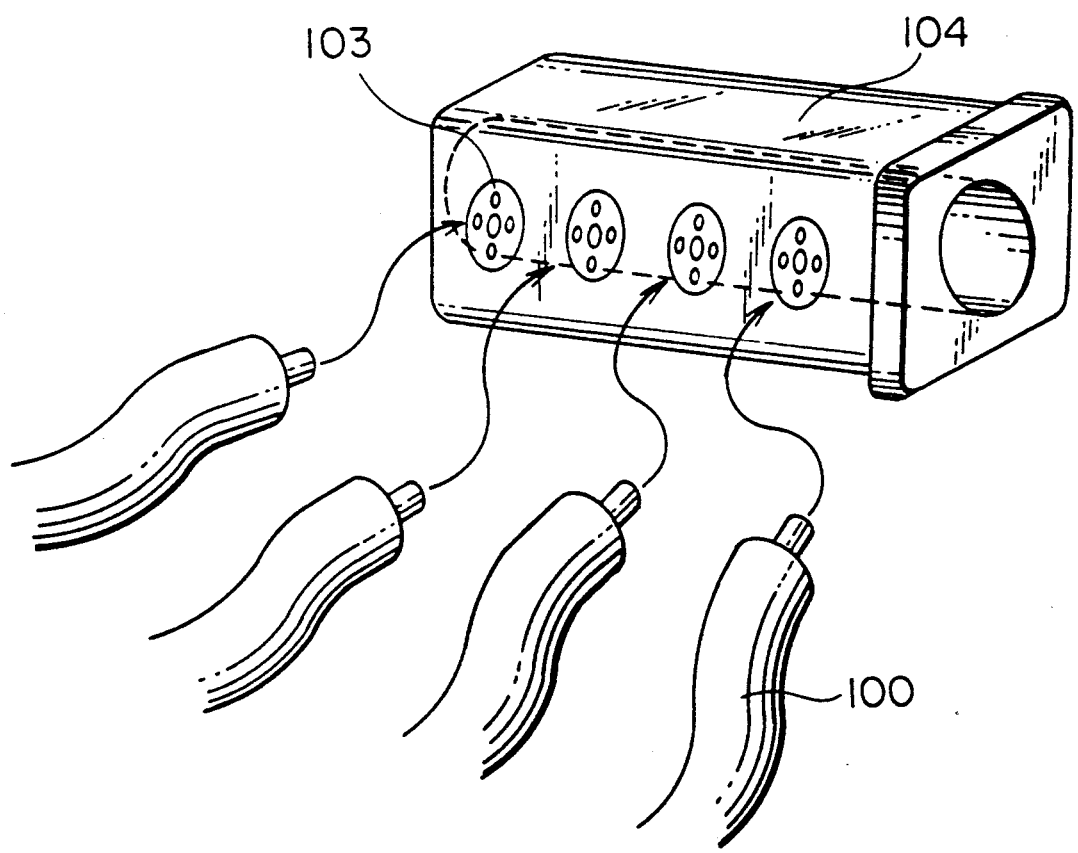
Figure 17B:
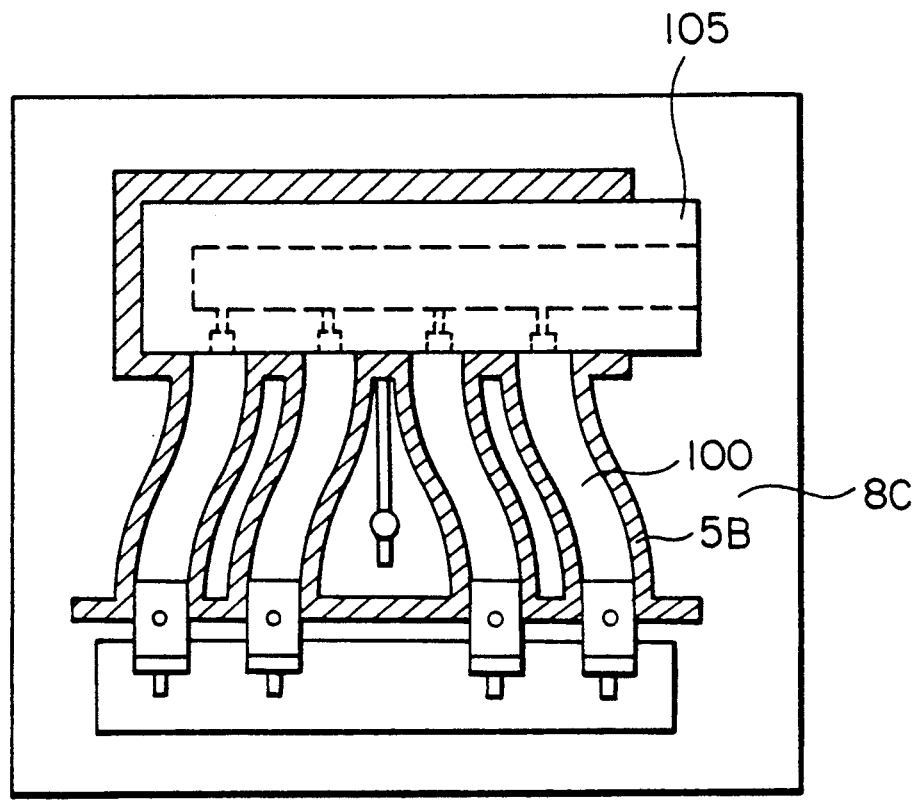
Figure 17C:
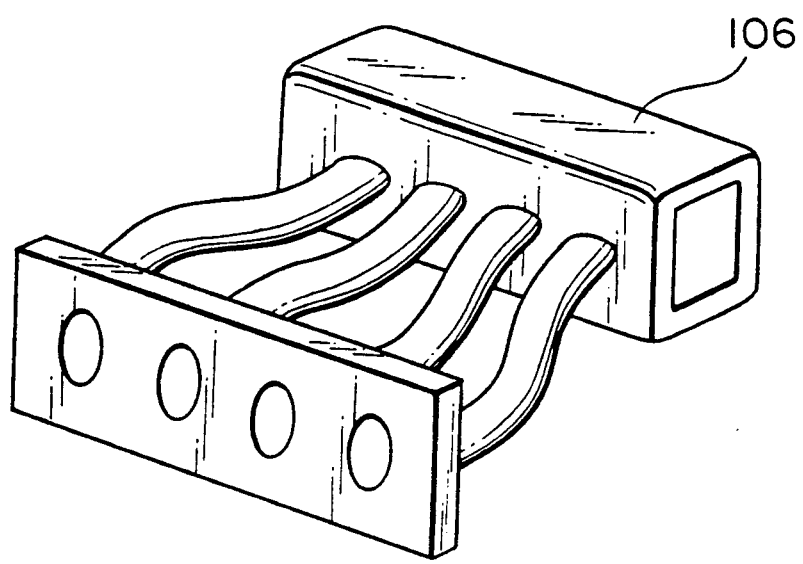

Next, in the case of the resin product in the shape of a multi-forked pipe shown in FIG. 17, magnets 103 are provided in a mold insert mandrel 104 for forming a hollow spacious portion which leads out of bent pipe portions, as in the case of the adapter shown in FIG. 12. A plurality of the cores 100 which have previously been preformed are connected to one another by means of the magnets 103 to obtain a core for molding. Subsequently, the core for molding is inserted into a mold 8C, and a resin 5 is packed into the mold cavity by injection molding or the like. Then, the resulting molded product 106 is taken out and the mold insert die 104 is withdrawn, after which the core 100 is withdrawn to obtain the resin product in the shape of a multi-forked pipe.

According to the present invention, a resin product having a bent hollow portion can be obtained by deforming a core having high flexibility and shape retention into a desired shape, inserting the deformed core into a mold, packing a resin into the mold cavity, and then withdrawn the core from the resulting molded product.

For producing a resin product of a two-forked or multi-forked pipe shape, it is sufficient that a plurality of the cores of this invention are united in a body by means of a part for branching or the like and used as a core for molding.

One example of constitution of a core for producing a two-forked molded product is the constitution of a core produced by combining the cores of this invention with a part for branching (a core-connecting part).

Here, the term "part for branching" means a part obtained by combining, by fitting, parts previously molded integrally or in at least two pieces, and joining them to one another by adhesion, deposition or the like. The structure of the part for branching and a material therefor are not critical so long as the part for branching has an ability to hold a plurality of the cores by insertion, interposition, or the like. As the material, there can used, for example, resins, metals, and ceramics.

When a core for a multi-forked pipe having a complicated shape is formed, it is sufficient that a plurality of the cores of this invention are connected to a rigid mold inset die, a core, or the like to unit them in a body. The core thus obtained can be used as a core for molding.

Specific examples are explained below for a pipe in the shape of the flanged S-tube shown in FIG. 11 with reference to FIGS. 12, 13, 14 and 15.

For example, in the case of the cores of the first and second embodiments, the cores are pushed in a mold for preforming while bending, and preformed. In this case, a mold for preforming 55 and an adapter 54 having pin holes or the like for positioning in a mold for injection molding, casting or the like are connected to the metal terminal part 2 side of a core 53. As a method for the connection of the adapter 54 to said core, there may be employed either a method of fixation by means of bolts, etc. or a method of inlaying a magnet 56 or the like in the adapter 54 and attaching the core to the adapter by means of the magnetic force.

Subsequently, the preformed core having the adapter 54 attached thereto is insert into the pin projections of a mold 8A while retaining its shape, and positioned, after which a resin 5A is packed into the cavity portion of the mold 8A by injection molding or the like. In this case, it is preferable to pack the resin 5A into the mold 8A from the metal terminal part 1 portion of the core so as to prevent generation of a bending force by the core 53 as much as possible.

After the packing of the resin into the mold 8A, the core 53 in the resulting molded product is withdrawn directly from the molded product in the mold. It is also possible to remove the core together with the molded product from the mold, fix the flange portion of the molded product 5B on a fixing instrument 59, and withdrawn 53 the core from the molded product 58, for example, by seizing or highing the metal terminal part 1 or the core by means of a seizing tool 60 or the like, or by using oil pressure. In this case, the adapter used for positioning in the mold is separated from the core 53 and left at the end of the molded product 5B or in the mold 8A.

The core withdrawn and the adapter 54 separated from the core are again combined and then preformed by means of a mold for preforming, and molding is carried out in the same manner as described above.

In the case of the core of the third embodiment, the heater inside the core is first heated to melt the low-melting alloy inside the core, imparting a high flexibility to the core, and the core and an adapter 54 are pushed in at a predetermined position of a mold for preforming 8' while bending the same. Next, the low-melting alloy inside the core is solidified, for example, by natural cooling, cooling of the mold for preforming 8, or cooling by induction of air into the cooling cavity inside the core. The core is then inserted into a mold 8A, and a resin 5 is packed into the mold cavity by injection molding, casting, or the like.

Subsequently, the heater inside the core is again heated to melt the low-melting alloy inside the core, and the core is drawn out in the same manner as described above, after which the procedure described above is repeated to obtain a molded product 51.

The designs of the metal terminal part 1 having a portion to hitch, the adapter 54 and the hitching tool 60 used in the present invention are not critical so long as the withdrawal of the core from a molded product and positioning of the core in a mold are possible.

EXAMPLES

This invention is illustrated with the following examples, which should not be construed as limiting the scope of the invention.

EXAMPLE 1

For forming the hollow portion of the flanged S-tube (length: 200 m, outside diameter $\phi$34 mm, curvature radius; 50 mm, outside diameter of the flange portion: $\phi$60 mm) shown in FIG. 11, a core was produced as follows. A metal flexible tube (outside diameter $\phi$19 mm, inside diameter $\phi$16 mm) having the constitution shown in FIG. 1A was covered with a heat-shrinkable silicone tube (thickness 1 mm, inside diameter $\phi$30 mm) and heated in an over at 150° C. for 10 minutes to shrink the silicone tube, whereby the silicone tube was adhered to the surface of flexible pipe. Then, silicone rubber was coated as elastomer on the flexible pipe to a thickness of 1.5 mm by casting under vacuum and vulcanized at about 150° C.

Figure 8:
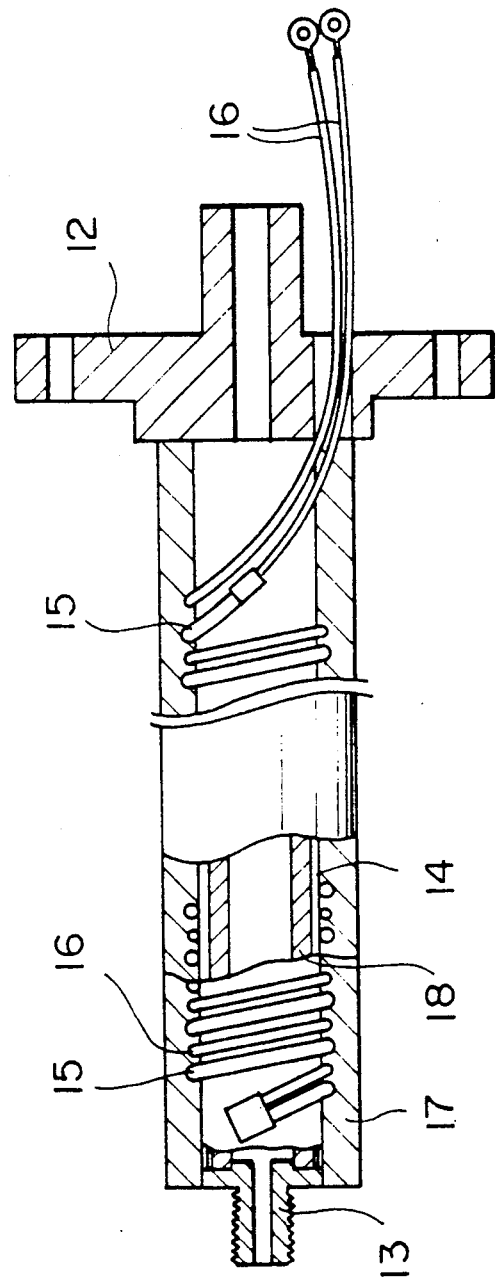

Next, the core thus obtained was deformed so as to fit the inside dimension of the S-tube and then inserted into a mold, after which the surface of the core was coated with 33% GRF-reinforced nylon 66 (LEONA ® 1300G mfd. by Asahi Chemical Industry Co.) by injection molding. After the molding, the core was withdrawn from the molded product in the mold. The core could be withdrawn with a force of about 100 kg, and thus a bent hollow pipe made of the resin could easily be obtained. These steps are schematically shown in FIG. 8.

| Injection molding conditions | |
|---|---|
| Injection pressure (kg/cm$^2$) primary/secondary | 600/200 |
| Packing time (sec) | 3 |
| Cooling time (sec) | 40 |
| Mold temperature (°C.) | 76 |
| Resin temperature (°C.) | 280 |

EXAMPLE 2

The same metal flexible pipe as used in Example 1 was coated with a heat-shrinkable silicone tube and fluororubber as elastomers in the same manner as in Example 1 to obtain a core. In the same manner as in Example 1, the core was deformed, followed by molding. Then, the core was withdrawn from the resulting molded product. The core could be withdrawn with substantially the same drawing force as in Example 1. A bent hollow pipe made of the resin was thus obtained.

EXAMPLE 3

Using the cores used in Examples 1 and 2, four resins, polyacetal (TENAC ® GA520 mfd. by Asahi Chemical Industry Ltd., reinforced with 20% of glass fiber e.g., GF), polyethylene terephthalate (SUNPET ® 3300G mfd. by Asahi Chemical Industry Ltd., reinforced with 30% of GF), PPS (Shin-etsu Chemical Industry Co., Ltd.) and polycarbonate (NOVAREX ® 7025G30 mfd. by Mitsubishi Chemical Industries Ltd., reinforced with 30% of GF) were individually injection-molded in the same manner as in Example 1. The cores were withdrawn from the molded products. In the case of these cores, the force required for the withdrawal was not greatly dependent on the type of resin, and bent hollow resin pipes could easily be obtained.

| Injection molding conditions for resin | | | | |
|---|---|---|---|---|
| | Polyacetal | PET | PPS | PC |
| Injection pressure (kg/cm$^2$) primary-secondary | 650/200 | 700/200 | 700/200 | 850/200 |
| Packing time (sec) | 3 | 3 | 3 | 3 |
| Cooling time (sec) | 60 | 60 | 60 | 60 |
| Mold temperature (°C.) | 76 | 100 | 80 | 90 |
| Resin temperature (°C.) | 200 | 280 | 310 | 280 |

EXAMPLE 4

A core was produced as follows. A flexible tube (outside diameter $\phi$19 mm, inside diameter $\phi$16mm) made of a metal (SUS) which had the constitution shown in FIG. 2A was coated with silicone rubber by the same method as in Example 1 so as to adjust the outside diameter of the coated tube to $\phi$27 mm. Then, such a flexible heater as shown in FIG. 8 which had an outside diameter of $\phi$14 mm and a heater capacity of 60 w/m was inserted into the flexible pipe coated with silicone rubber and fixed, and a low-melting alloy (melting point: 138° C.) was powered between the heater and the flexible tube and closed therein to obtain a core (FIG. 7).

Subsequently, the heater inside the core was heated at 150° C. to melt the low-melting alloy, after which the core was deformed in the same manner as in Example 1 and cooled to solidify the low-melting alloy, whereby the core was preformed. The core was then inserted into a mold and 33% GF-reinforced nylon 66 resin was packed into the mold cavity in the same manner as in Example 1. After the packing, the heater was charged with electricity for about 3 minutes from the beginning of cooling time to melt the low-melting alloy inside the core again, and the core was withdrawn from the molded product in the mold. The core could easily be withdrawn with a force of about 70 kg, and a bent pipe made of the resin was thus obtained.

EXAMPLE 5

Molding was conducted in exactly the same manner as in Example 4, except that the melting point of low-melting alloy inside the core used in Example 4 was changed from 138° C. to 74° C. (substantially the same temperature as the mold temperature).

After packing of the resin into the mold cavity was completed, the center temperature of the core reached 100° C. in cooling time (60 sec), and the low-melting alloy inside the core melted without charging the inner heater with electricity. Consequently, the core could be withdrawn from the molded product, and a bent hollow pipe made of the resin was obtained.

EXAMPLE 6

Using the core used in Example 5, a composition prepared by incorporating 0.3% of a blowing agent into the resin (30% GF-reinforced nylon 66 resin) was subjected to structural form injection molding (foam level: 5 to 10%) by a short-shot method. The core was drawn out from the resulting molded product to obtain a bent hollow pipe made of the resin. In this case, the core could easily be drawn out with a drawing force 30% lower than that in Example 5.

EXAMPLE 7

A metal rod which had previously been bent so as to fit a S-tube shape was inserted into the same flexible metal pipe as used in Example 4 which served as a skeletal structure. The metal pipe was then coated with a heat-shrinkable silicon tube and silicone rubber as elastomers by the same vacuum casting as in Example 1 except for using a split mold. The core thus obtained was inserted into a mold and 33% GF-reinforced nylon 66 resin was molded in exactly the same manner as in Example 1, after which the core was withdrawn from the molded product. The core could be withdrawn from the molded product with a force of about 100 kg, and thus a bent hollow pipe made of the resin could easily be obtained.

EXAMPLE 8

As shown in FIG. 16, two cores having the same constitution as that of the core used in Example 7 were connected to each other by fitting by means of part of branching made of resin having a snap-fitting structure and projections enabling positioning in a mold which had previously been made of 43% GF-reinforced nylon 66 resin (LEONA ® 14G43 mfd. by Asahi Chemical Industry Co.) by injection molding in two pieces. Then, the ends of the cores and the part for branching were fixed by interposition, as a core for molding, simultaneously with mold-closing operation, and molding was conducted by the same method as in Example 4. Thereafter, only the two cores were withdrawn from the molded product to obtain a two-forked resin product having a bent hollow portion. In this case, the part for branching remained in the molded product and constituted a part of the product.

EXAMPLE 9

As shown in FIG. 17, four cores having the same constitution as that of the core used in FIG. 4 were connected to a mold insert die for forming a hollow spacious portion, by means of the magnetic power of magnet inlaid in the mode insert die, whereby a core for molding was obtained.

The molding was conducted by the same method as in Example 4, after which the four cores were withdrawn one by one. Thereafter, the metal insert die was withdrawn to obtain a resin product having a bent hollow portion containing a hollow spacious portion.

In all of the above examples, there occurred neither marked change of the thickness of molded product nor its breakage at the time of withdrawal of the core, and a resin product having a satisfactory bent hollow portion could be obtained. Moreover, repeated use of the core had no substantial influence on the quality of molded product.

COMPARATIVE EXAMPLES

Comparative Example 1

Figure 11:
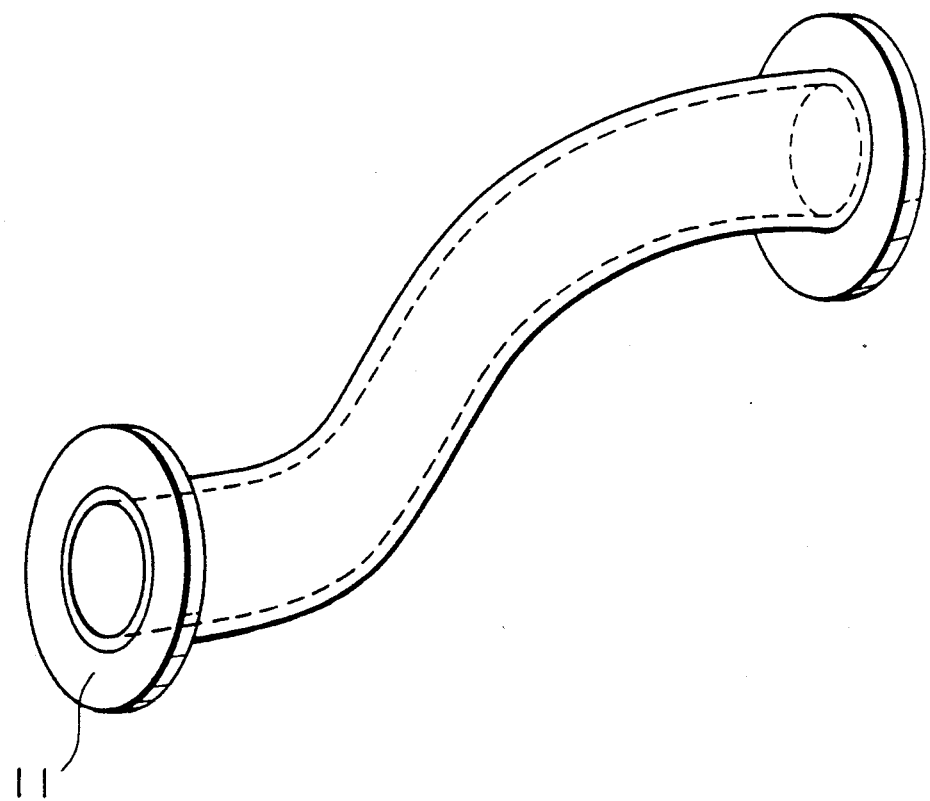

A core was cast in a low-melting alloy (melting point of 138° C.) in the shape of the S-tube shown in FIG. 11 so as to adjust the inside diameter of hollow portion of the tube to ϕ27 mm.

Then, the core was inserted into a mold for injection molding and 33% GF-reinforced nylon 66 resin (LEONA ® (300G) mfd. by Asahi Chemical Industry Co., of natural color) was packed into the mold cavity at an injection pressure of 500 kg/cm². After the molding, the molded product was removed from the mold and placed in a heating chamber (an air oven) at 150° C. to melt away the core. But, the melting-away of the core required 3 hours or more and a color change of the molded article occurred. In addition, the low-melting alloy adhered to the inner surface of the S-tube molded product and could not completely be removed in the case of the method employed herein.

COMPARATIVE EXAMPLE 2

In order to reduce thermal discoloration of molded product and melting-away time, molding was conducted using an alloy having a melting point of 74° C., in the same manner as in Comparative Example 1.

But, the surface of the core melted at the resin temperature at the time of resin packing, so that no satisfactory molded product could be obtained.

COMPARATIVE EXAMPLE 3

For forming the hollow portion of the flanged S-tube shown in FIG. 11, a flexible metal pie (outside diameter ϕ19 mm, inside diameter 16 mm) having the constitution shown in FIG. 1(a) was used as a core. The flexible pipe was deformed into a desired shape and then inserted into a mold, and injection molding was conducted in the same manner as in Comparative Example 1. After the molding, an attempt was made to withdrawn the core from the molded product, but because of intrusion of resin into the uneven portion of the flexible tube, the core could not be withdrawn and was broken.

As is clear from the above examples, the present invention has the following peculiar effects.

(1) The core of this invention obtained by coating a skeletal structure having high flexibility and shape retention with an elastomer can be repeatedly used, and a resin product having a bent hollow portion can easily be obtained merely by withdrawing the core after applying a resin to the core.

(2) A resin product having a bent hollow portion composed of a two-forked or multi-forked pipe having a complicatedly forked, bent, hollow portion can easily be obtained by using a plurality of cores combined by means of a part for branching, or the like.

What is claimed is:

1. A core for producing a resin product having a bent hollow portion, which comprises a skeletal structure of a flexible metal tube or pipe, an elastomer provided on said skeletal structure, and a low-melting point alloy sealed within a hollow interior of said flexible metal tube or pipe, said low-melting point alloy being melted to increase flexibility of said core and solidified to add rigidity to said core;

said flexible metal tube or pipe having such a high retention of shape that the core is not substantially deformed at least by resin flow pressure during molding, and such a high flexibility that, at the time of withdrawal of the core, the core is deformed in accordance with the shape of the molded resin product and does not injure the molded resin product and that the bending or unbending force of the core is 50 kg or less; and said elastomer is a member selected from the group consisting of a natural rubber, a silicone rubber, a fluororubber, a urethane rubber and a butadiene rubber, and having such properties that said elastomer is not adhesive and does not flow at the molding temperature of the resin product when the core is drawn out.

2. The core for producing a resin product having a bent hollow portion according to claim 1, said core further comprising a flexible heater provided in said hollow interior of the flexible metal tube or pipe, and said low-melting point alloy is sealed between said flexible metal tube or pipe and said flexible heater.

3. The core for producing a resin product having a bent hollow portion according to claim 1, wherein said core comprises a forked core obtained by joining a plurality of cores to one another through a part for branching.

4. The core for producing a resin product having a bent hollow portion according to claim 1, wherein said core comprises a plurality of cores for forming bent hollow portions connected to a rigid insert mandrel for forming a hollow spacious portion which is combined with said bent hollow portions.

5. A process for producing a resin product having a bent hollow portion, comprising the steps:

(1) providing a flexible core;
(2) sealing a low-melting point alloy inside a hollow interior of said flexible core;
(3) forming a coating on an external surface of said flexible core with an elastomer, said elastomer being non-adhesive to a resin used to form said resin product;
(4) heating said flexible core to melt said low-melting point alloy;
(5) preforming said flexible core into a desired shape corresponding to said bent hollow portion of the resin product;
(6) cooling said flexible core;
(7) installing said flexible core into a mold;
(8) applying said resin into said mold to form said resin product, said resin directly contacting said elastomer coating on the external surface of the flexible core, said elastomer remaining on said flexible core and not flowing at a molding temperature of said resin product;
(9) removing said resin product from said mold;
(10) reheating said flexible core to melt said low melting point alloy; and
(11) withdrawing said flexible core from said resin product, such that said elastomer is removed with said core.

6. The process for producing a resin product having a bent hollow portion of claim 5, wherein the step of providing a flexible core comprises constructing a forked core by joining a plurality of cores to one another through a part for branching.

7. The process for producing a resin product having a bent hollow portion of claim 5, wherein the step of providing a flexible core further comprises connecting said flexible core to a rigid mandrel, said rigid mandrel being installed into said mold together with said flexible core such that said resin product is formed with a hollow spacious portion combined with said bent hollow portion.

8. The process for producing a resin product having a bent hollow portion of claim 5, wherein the step of applying said resin into said mold comprises injection molding.

9. The process for producing a resin product having a bent hollow portion of claim 5, wherein the step of applying said resin into said mold comprises cast molding.

10. The process for producing a resin product having a bent hollow portion of claim 5, wherein said flexible heater is installed in said hollow interior of said flexible core.

11. A process for producing a resin product having a bent hollow portion, comprising the steps:

(1) heating a flexible core to melt a low-melting point alloy sealed inside a hollow interior of said flexible core;
(2) preforming said flexible core into a desired shape corresponding to said bent hollow portion of the resin product;
(3) cooling said flexible core;
(4) installing said flexible core into a mold;
(5) applying said resin into said mold to form said resin product, said resin directly contacting an elastomer coating on an external surface of said flexible core, said elastomer coating remaining on said flexible core and not flowing at a molding temperature of said resin product;
(6) removing said resin product form said mold;
(7) reheating said flexible core to melt said low melting point alloy; and
(8) withdrawing said flexible core form said resin product, such that said elastomer coating is removed with said core.

* * * * *